United States Patent [19]

Ronco et al.

[11] Patent Number: 4,518,077

[45] Date of Patent: May 21, 1985

[54] POLYMERIC SNAP-THROUGH ATTACHMENT FOR A HOLLOW RIVET CHAIN

[75] Inventors: Kenneth J. Ronco, Brookfield; Robert Sommer, Mequon; Ken Nigel; Donald Grimes, both of New Berlin; James A. Zirbes, Wauwatosa; Robert E. Stacey, Waukesha, all of Wis.

[73] Assignee: Rexnord Inc., Brookfield, Wis.

[21] Appl. No.: 410,185

[22] Filed: Aug. 23, 1982

[51] Int. Cl.³ .............................................. B65G 19/24
[52] U.S. Cl. ...................................... 198/731; 198/648
[58] Field of Search ............... 198/648, 779, 651, 712, 198/731, 733; 474/226, 224, 230, 231

[56] References Cited

U.S. PATENT DOCUMENTS 2,756,867 8/1956 Russell et al. ...................... 198/731
3,961,702 6/1976 Blok ..................................... 198/731

FOREIGN PATENT DOCUMENTS 838124 3/1952 Fed. Rep. of Germany ...... 198/731
713780 1/1977 U.S.S.R. ............................. 198/733

*Primary Examiner*—Joseph E. Valenza
*Assistant Examiner*—Dennis Williamson
*Attorney, Agent, or Firm*—Richard C. Ruppin

[57] ABSTRACT

A polymeric snap-on attachment for a hollow rivet chain including first and second side members adapted to lie adjacent to the sidebars of the chain. At least one of the side members includes an integral pin-like projection adapted to fit through one of the hollow rivets in the chain. The other side member includes a receptacle which receives the pin-like projection with a snap fit to fix the first and second side members to each other and to the chain.

12 Claims, 9 Drawing Figures

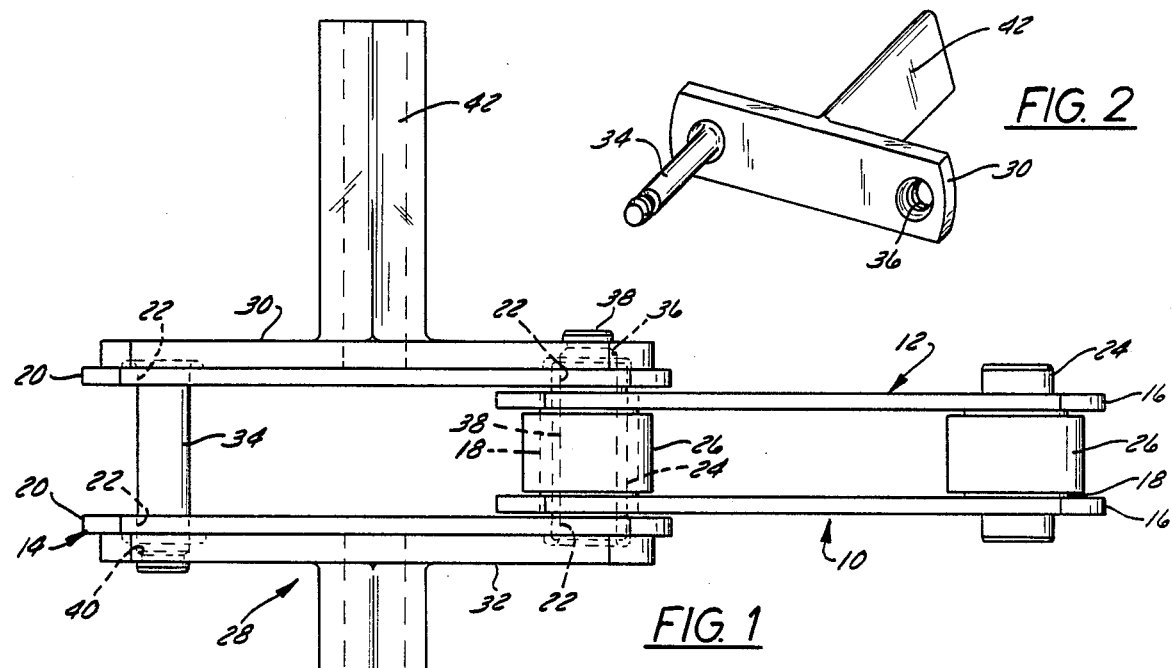
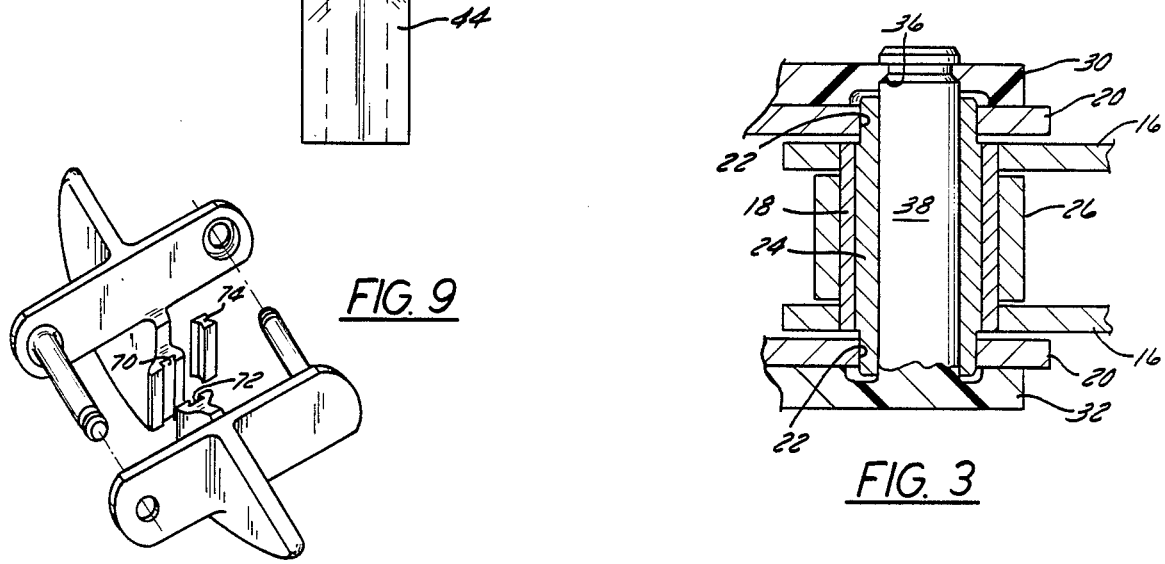
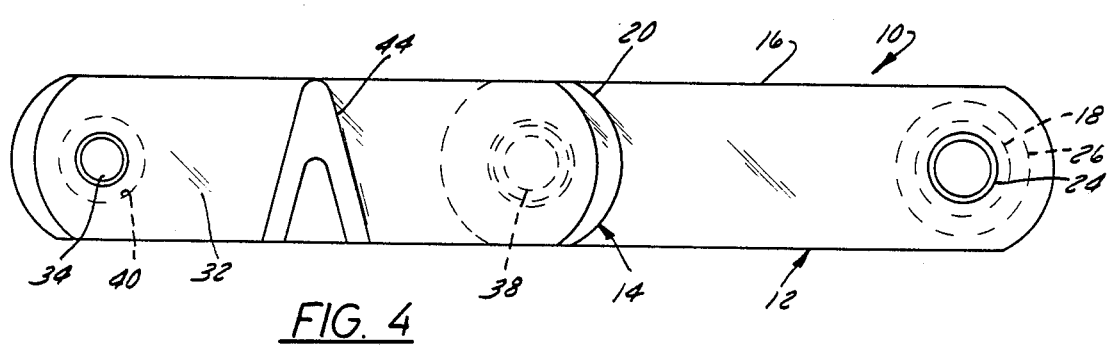

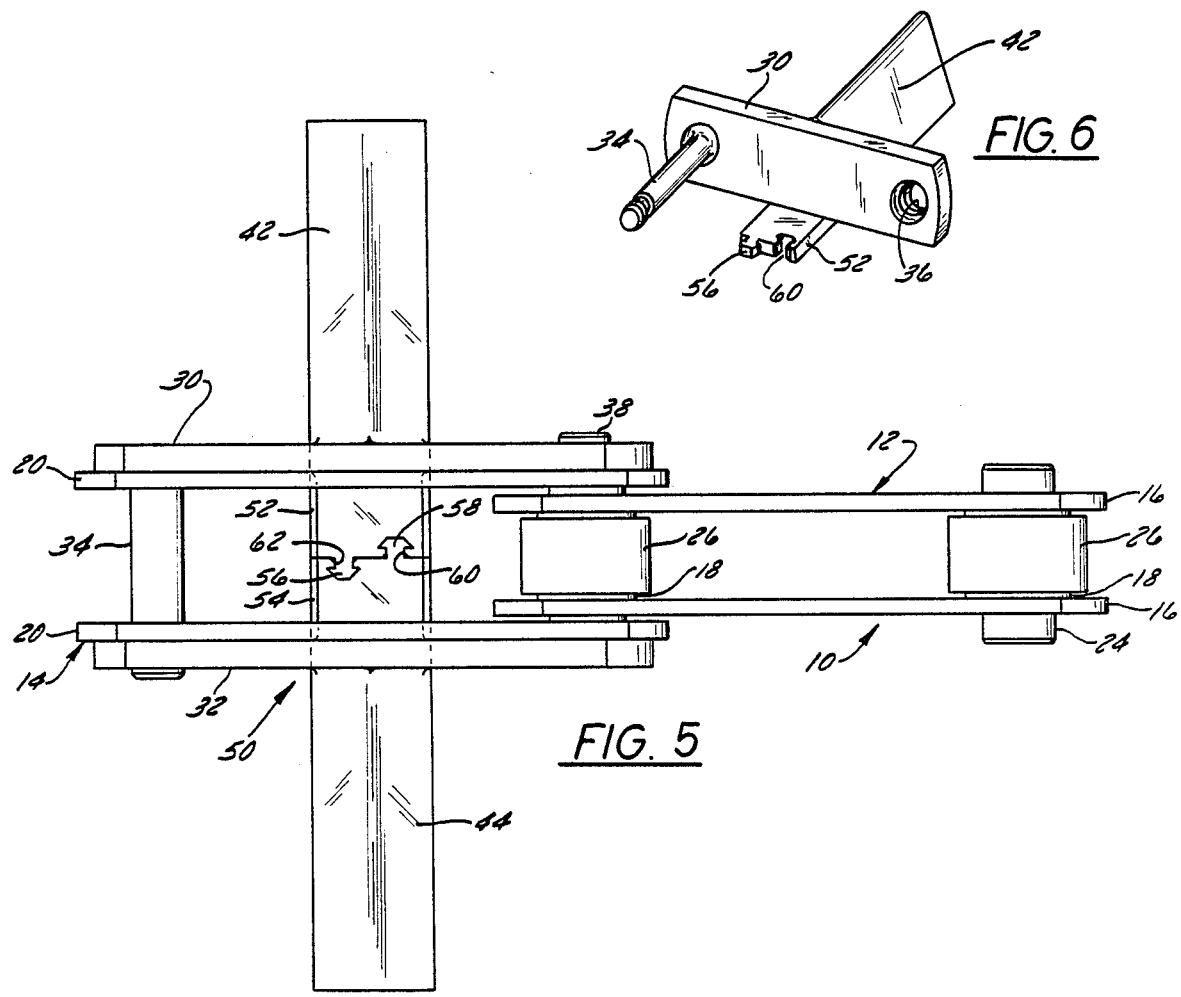
FIG. 6
FIG. 5
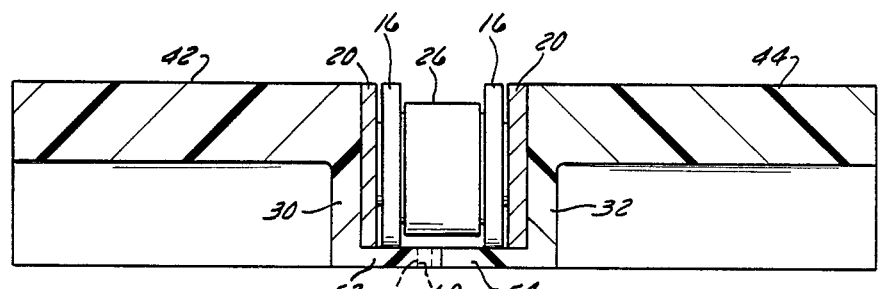
FIG. 7
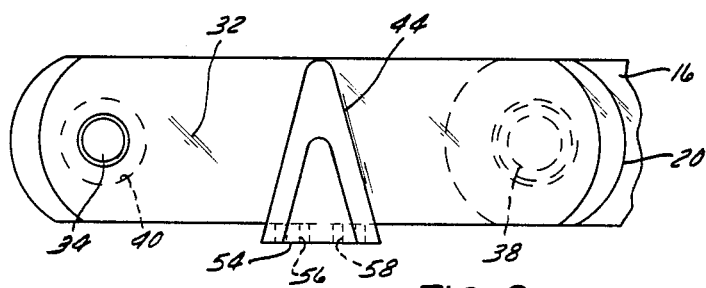
FIG. 8

POLYMERIC SNAP-THROUGH ATTACHMENT FOR A HOLLOW RIVET CHAIN

BACKGROUND OF THE INVENTION

This invention relates to chain attachments, and, more specifically, to a polymeric snap-through attachment for a hollow rivet chain.

Attachments have been added to chains for many years. The attachment extensions can be of various types and shapes. There are pusher flight attachments, blade attachments for chain that is used in digging, flat top attachments for carrying articles, and many other types of attachments. The attachments have been attached to the chains in various manners, such as by welding, bolting, and so forth. U.S. Pat. No. 4,096,943 "Gentsch" shows a top plate assembly which is attached to a chain by resiliently fitting over an extended chain pin.

The flights which are welded and bolted on are heavy, because they are made of metal, and are expensive, due to the labor and materials involved in the welding or bolting. The flights or attachments may occasionally be exposed to large stresses, which may damage the flight or the link to which it is solidly attached or may damage the conveyor itself. If a link is damaged, the chain must be taken apart and that link removed, thereby requiring a substantial amount of labor. In many cases the removal and reassembly are very difficult to perform in the field. If the flight has been welded on, and the flight is damaged, again the link must be removed. If the flight has been bolted in place, and the flight is damaged, it is possible to remove the flight and install another flight, but this is another labor intensive operation.

SUMMARY OF THE INVENTION

The present invention provides attachments which are made of a polymeric material. The polymeric attachments are made in two pieces and include portions which are adapted to snap together through a hollow pin in the chain. These attachments are relatively inexpensive, light weight, and easy to assemble. The light weight means that friction between the attachment and the supporting surface is reduced, so that less power is required to drive the chain. The attachment may also be made of a material which has a lower coefficient of friction when contacting the supporting surface than does steel. In the event that these attachments are exposed to unusually large stresses, they will separate from each other and fall off of the chain so as to protect the chain and conveyor from damage. When the obstruction which caused the high stresses is cleared from the conveyor, the separated attachment pieces can be recovered and again installed on the chain in the field with a minimum amount of labor and expense involved.

BRIEF DESCRIPTION OF THE DRAWINGS

FIG. 1 is a top view of a chain including a polymeric snap-on attachment made in accordance with the present invention.

FIG. 2 is a perspective view of one-half of the attachment shown in FIG. 1.

FIG. 3 is a broken-away top view partially in section of the chain and attachment shown in FIG. 1.

FIG. 4 is a side view of the chain and attachment shown in FIG. 1.

FIG. 5 is a top view of a second embodiment of a chain and attachment made in accordance with the present invention.

FIG. 6 is a perspective view of one-half of the attachment shown in FIG. 5.

FIG. 7 is an end view partially in section of the chain and attachment shown in FIG. 5.

FIG. 8 is a side view of the chain and attachment shown in FIG. 5.

FIG. 9 is a perspective view of a third embodiment of an attachment made in accordance with the present invention.

DESCRIPTION OF THE PREFERRED EMBODIMENTS

FIG. 1 shows a hollow rivet chain 10 which is made up of inner links 12 and outer links 14. Each inner link 12 includes two sidebars 16 connected to each other by two bushings 18. The outer links 14 include two sidebars 20 each having two holes 22. The inner links 12 and the outer links 14 are connected together by means of hollow rivets 24 which have an interference fit with the outer link sidebars 20 and a clearance fit with the bushings 18 (free to rotate in bushing). In this particular embodiment, rollers 26 are mounted outside of the bushings 18.

An attachment 28 is shown here as being mounted over the outer link 14. The attachment 28 is made up of first and second side members 30, 32 which lie adjacent to the outer sidebars 20 of the chain 10. The first and second side members 30, 32 shown here are identical to each other so that both side members may be produced from the same mold. The first side member 30 includes an integrally molded pin-like projection 34 which is adapted to fit through one of the hollow rivets 24 in the chain. The first side member 30 also includes a receptacle 36. Likewise, the second side member 32 includes an integrally molded pin-like projection 38 and a receptacle 40. The receptacle 40 in the second side member has a varying inside diameter which corresponds to the varying outside diameter of the pin-like projection 34 such that the pin-like projection 34 is received with a snap fit in the receptacle 40. Likewise, the receptacle 36 in the first side member has a varying internal diameter which corresponds to the varying outside diameter of the pin-like projection 38 so as to receive that pin-like projection with a snap fit. The first pin-like projection 34 and its corresponding receptacle 40, and the second pin-like projection 38 and its corresponding receptacle 36 thereby permit the first and second side members 30, 32 to be attached to each other at two points through the hollow rivets 24 of the chain 10.

Each side member 30, 32 includes an integrally molded extension 42, 44 which, in this case, is a pusher extension having an inverted V-shaped cross-section. This particular extension was designed for the purpose of pushing grain in a grain conveyor. However, many different types of extensions could be used in accordance with this invention. Also, it is not necessary that both the first and second side members 30, 32 have extensions. For some applications, only one of the side members would have an extension. The extensions could include blade attachments for chain that is used in digging, flat top extensions for carrying articles and many other types of extensions. While the embodiment shown here provides two side members 30, 32 attached to each other at two points, it is possible that the two side members would be attached only at one point through one hollow rivet in the chain. This might be required if the chain is a pintle-type in which each link has only one barrel. It is also possible that both of the projections 34, 38 would extend from one of the side members and both of the receptacles 36, 40 would be located in the other of the side members.

A second embodiment of the invention is illustrated in FIGS. 5, 6, 7, and 8. In this embodiment the hollow rivet chain 10 is identical to the chain of the previous embodiment. The attachment 50 includes first and second side members 30, 32, first and second pin-like projections 34, 38, and first and second receptacles 36, 40 like those of the attachment 28 shown in the previous embodiment. The side members 30, 32 also include extensions 42, 44. The difference between this attachment 50 and the previous attachment 28 is in the inwardly directed legs 52, 54 which are located on the lower portions of their respective side members 30, 32. As shown here, each inwardly directed leg 52, 54 includes a lower projection 56, 58 and a lower receptacle 60, 62. The legs are adapted to extend underneath the chain 10 so that the corresponding projections and receptacles snap together underneath the chain to further secure the attachment 50 to the chain 10. While each leg 52, 54 is shown here to include both a lower projection and a lower receptacle, so that the two side members 30, 32 are identical to each other, it is not necessary for each leg 52, 54 to have both a lower projection and a lower receptacle. Instead, one leg could include a projection and the other leg could include a receptacle so that the legs would snap together under the chain. Alternatively, both legs could include receptacles 70, 72 which could be held together by a separate keeper 74, as shown in FIG. 9.

While the specification has already suggested several modifications to the embodiments shown in the drawings, it will be obvious to one skilled in the art that other combinations and modifications could be made within the scope of the present invention.

What is claimed is:

1. A polymeric snap-on attachment for a hollow rivet chain, comprising:
   first and second side members adapted to lie adjacent to the sidebars of the chain, at least one of said side members including an integral extension, and at least one of said side members including an integral pin-like projection adapted to fit through one of the hollow rivets in said chain; the other of said side members having a receptacle which receives said pin-like projection with a snap fit so as to fix said first and second side members to each other and to the chain, and an inwardly directed leg located on the lower portion of each side member and being adapted to be. attached to each other underneath the chain.

2. A polymeric snap-on attachment for a hollow rivet chain as recited in claim 1, wherein one of said legs includes a lower projection and the other of said legs includes a corresponding lower receptacle, said legs being adapted to snap together underneath the chain in order to further secure said attachment to said chain.

3. A polymeric snap-on attachment for a hollow rivet chain as recited in claim 2, wherein each of said legs includes a lower projection and a lower receptacle.

4. A polymeric snap-on attachment for a hollow rivet chain as recited in claim 1, wherein each inwardly directed leg includes a lower receptacle, and further comprising a keeper to be received by said lower receptacles.

5. A polymeric snap-on attachment for a hollow rivet chain, comprising:
   first and second side members adapted to lie adjacent to the sidebars of the chain, at least one of said side members including an integral extension, and said side members each including an integral pin-like projection adapted to fit through one of the hollow rivets in said chain; and each of said side members having a receptacle which receives said pin-like projection with a snap fit so as to fix said first and second side members to each other and to the chain, and such that said first and second side members can be attached to each other at two points, said first and second side members being identical to each other, and each including an integral extension, such that both side members may be produced from the same mold, and an inwardly directed leg located on the lower portion of each side member and being adapted to be attached to each other underneath the chain.

6. A polymeric snap-on attachment for a hollow rivet chain as recited in claim 5, wherein one of said legs includes a lower projection and the other of said legs includes a corresponding lower receptacle, said legs being adapted to snap together underneath the chain in order to further secure said attachment to said chain.

7. A polymeric snap-on attachment for a hollow rivet chain as recited in claim 6, wherein each of said legs includes a lower projection and a lower receptacle.

8. A polymeric snap-on attachment for a hollow rivet chain as recited in claim 5, wherein each inwardly directed leg includes a lower receptacle, and further comprising a keeper to be received by said lower receptacles.

9. A polymeric snap-on attachment for a hollow rivet chain, comprising:
   first and second side members adapted to lie adjacent to the sidebars of the chain, at least one of said side members including an integral extension, and said side members each including an integral pin-like projection adapted to fit through respective ones of the hollow rivets in said chain; and each of said side members having a receptacle which receives said pin-like projections with a snap fit so as to fix said first and second side members to each other and to the chain, and fit, such that said first and second side members can be attached to each other at two points, said projections having a varying outside diameter and said receptacles having a varying inside diameter for receiving said projections with a snap fit, said first and second side members being identical to each other, and each including an integral extension, such that both side members may be produced from the same mold, and an inwardly directed leg located on the lower portion of each side member being adapted to be attached to each other underneath the chain.

10. A polymeric snap-on attachment for a hollow rivet chain as recited in claim 9, wherein one of said legs includes a lower projection and the other of said legs includes a corresponding lower receptacle, said legs being adapted to snap together underneath the chain in order to further secure said attachment to said chain.

11. A polymeric snap-on attachment for a hollow rivet chain as recited in claim 10, wherein each of said legs includes a lower projection and a lower receptacle.

12. A polymeric snap-on attachment for a hollow rivet chain as recited in claim 9, wherein each inwardly directed leg includes a lower receptacle, and further comprising a keeper to be received by said lower receptacles.

* * * * *